United States Patent [19]

Evers et al.

[11] 3,985,908
[45] Oct. 12, 1976

[54] 3-FURYL SULFIDES AND FOODSTUFF FLAVOR COMPOSITIONS COMPRISING SAME

[75] Inventors: William J. Evers, Middletown; Howard H. Heinsohn, Jr., Hazlet; Manfred Hugo Vock, Locust; Christopher Giacino, Califon, all of N.J.

[73] Assignee: International Flavors & Fragrances Inc., New York, N.Y.

[22] Filed: Mar. 12, 1976

[21] Appl. No.: 666,351

Related U.S. Application Data

[63] Continuation-in-part of Ser. No. 581,962, May 29, 1975.

[52] U.S. Cl............................ 426/535; 260/294.8 G
[51] Int. Cl.²................... A23L 1/226; A23L 1/231
[58] Field of Search.............. 260/294.8 G, 347.2; 426/535

[56] References Cited
UNITED STATES PATENTS

| | | | |
|---|---|---|---|
| 3,666,495 | 5/1972 | Evers et al. | 426/535 |
| 3,872,111 | 3/1975 | Evers et al. | 260/347.2 |
| 3,873,731 | 3/1975 | Evers et al. | 426/535 |
| 3,891,710 | 6/1975 | Evers et al. | 260/347.2 |
| 3,910,966 | 10/1975 | Evers et al. | 260/347.2 |
| 3,917,869 | 11/1975 | Evers et al. | 426/535 |

*Primary Examiner*—Joseph M. Golian
*Attorney, Agent, or Firm*—Arthur L. Liberman; Harold Haidt; Franklin D. Wolffe

[57] ABSTRACT

Novel 3-furyl sulfides having the formula:

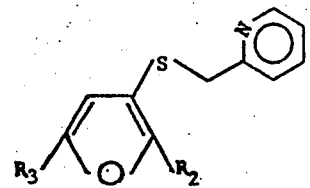

wherein $R_2$ and $R_2$ are each selected from the group consisting of hydrogen and methyl; at least one of $R_2$ and $R_3$ being methyl, such 3-furyl sulfides being useful in modifying or enhancing the organoleptic properties of foodstuffs (e.g. taste and/or aroma).

8 Claims, 4 Drawing Figures

NMR SPECTRUM FOR THE PRODUCT OF EXAMPLE I

FIG.1

NMR SPECTRUM FOR THE PRODUCT OF EXAMPLE I

IR SPECTRUM FOR THE PRODUCT OF EXAMPLE I

NMR SPECTRUM FOR THE PRODUCT OF EXAMPLE III

IR SPECTRUM FOR THE PRODUCT OF EXAMPLE III

FIG.4

3-FURYL SULFIDES AND FOODSTUFF FLAVOR COMPOSITIONS COMPRISING SAME

This application is a continuation-in-part of U.S. application for Letters Pat. Ser. No. 581,962, filed on May 29, 1975.

BACKGROUND OF THE INVENTION

The present invention relates to novel 3-furyl sulfides.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variation can be reflected in the end product and results in unreliable flavor characteristics and uncertainty as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the mechanism for flavor development in many foods is not understood. This is notable is products having meaty, sweet meat, nutty and tomato-like flavor characteristics.

Reproduction of meaty, sweet meat, nutty and tomato-like flavors and aromas has been the subject of the long and continuing search by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of sweet meat products including liver product are required. In addition, a need exists for imparting, modifying or enhancing nuttty and tomato-like nuances to foodstuffs.

Moreover, there are a great many meat containing or meat based foods presently distributed in a preserved form. Examples being condensed soups, dry-soup mixes, dry meat, freeze-dried or lyophilized meats, packaged gravies and the like. While these products contain meat or meat extracts, the fragrance, taste and other organoleptic factors are very often impaired by the processing operation and it is desirable to supplement or enhance the flavors of these preserved foods with versatile materials which have either meaty, sweet meat, nutty and/or tomato-like aroma and taste nuances.

U.S. Pat. No. 3,666,495 has to do with certain furan derivatives having desirable meat, roast meat and roasted fragrance and flavor notes. Among the furan derivatives disclosed in said patent are methyl (2-methyl-3-furyl) trisulfide obtained by the reaction of 2-methyl-3-furan thiol with methyl disulfur chloride at a temperature of from −60° C to 0° C, and methyl (2-methyl-3-furyl) disulfide obtained by reacting 2-methyl-3-furan thiol with methane sulfenyl chloride.

Such 3-furyl alkyl disulfides possess organoleptic properties different in flavor character and intensity from the 3-furyl sulfides of our invention.

U.S. Pat. No. 3,836,563 issued on Sept. 17, 1974 broadly discloses 3-furyl alkyl sulfides having the structure:

wherein $R_6'$ may be alkyl such as methyl, ethyl, n-propyl, isopropyl, n-butyl, isobutyl, n-hexyl, n-octyl and n-nonyl (See Col. 4, lines 10–18) and $R_7'$, $R_8'$ and $R_9'$ are either hydrogen or alkyl. Such 3-furyl alkyl sulfides of U.S. Pat. No. 3,836,563 possess organoleptic properties different in flavor character and intensity from the 3-furyl sulfides of our invention.

The present invention provides novel 3-furyl sulfides for altering, modifying or enhancing the meaty, nutty or tomato flavor or aroma of foodstuffs. Briefly, the novel compounds of our invention are 3-furyl sulfides having the formula:

wherein $R_2$ and $R_3$ are each selected from the group consisting of hydrogen and methyl, at least one of $R_2$ and $R_3$ being methyl.

Thus, for example, 3-furyl sulfides contemplated within the scope of our invention are:

| 3-furyl Sulfide Compound | Structure |
|---|---|
| (2-methyl-3-furyl)(2-pyridylmethyl)sulfide |  and; |
| (2-pyridylmethyl)(2,5-dimethyl-3-furyl)sulfide | |

The 3-furyl sulfides of our invention can be prepared by a process comprising the step of:

i. Providing a 2-ene-1,4-dione having the structure:

ii. Intimately admixing said 2-ene-1,4-dione with a pyridine methyl thiol having the formual thereby providing a substituted 2-thia substituted 1,4-dione having the structure:

iii. Cyclizing said 2-thia substituted 1,4-dione to form a substituted or unsubstituted 3-furyl sulfide having the formula:

wherein $R_2$ and $R_3$ are each hydrogen or methyl; at least one of $R_2$ and $R_3$ being methyl. Either $R_2$ or $R_3$ may be hydrogen in the event that in step (ii) the 2-ene-1,4-dione is admixed with the thiol in the presence of an organic base such as piperidine, pyridine, triethyl amine, quinoline or alpha-picoline or a mixture thereof.

The 2-ene-1,4-dione may be prepared by reacting 2,5-dialkoxy-2,5-dialkyl-2,5-dihydrofuran with a weak acid hydrolysis agent such as 1% aqueous acetic acid under reflux conditions. The resulting material will be in the case of starting with 2,5-dimethoxy-2,5-dimethyl-2,5-dihydrofuran, cis-3-hexen-2,5-dione.

The resulting 2-ene-1,4-dione is then reacted with the thiol, an example of which is 1-mercaptomethylpyridine.

The reaction may be carried out in a solvent such as water or an ether such as diethyl ether or a hydrocarbon such as benzene or hexane or cyclohexane. The reaction may also be carried out without the use of a solvent. The reaction may be carried out under reflux conditions, although temperatures varying from 0° up to 60° C are suitable and will give rise to commercially suitable yields.

The aforementioned 2-thia substituted 1,4-diones are then cyclized to form substituted or unsubstituted 3-thia furans according to the following reaction:

wherein $R_2$ and $R_3$ are defined as above. The resulting 3-furyl sulfides (novel compounds of our invention) are used for their organoleptic properties.

The cyclization reaction carried out in cyclizing the 2-thia substituted 1,4-dione is carried out in the presence of a cyclization agent, preferably, isopropenyl acetate. The cyclization is also carried out in the presence of such a catalyst as concentrated sulfuric acid, zinc chloride, boron triflouride, aluminum trichloride, and para-toluene sulfonic acid, each of these being acid catalysts. Preferably, the ratio of isopropenyl acetate to 2-thia substituted 1,4-dione is 4 or 5:1. The ratio of acid catalyst to isopropenyl acetate is from 0.001 up to 0.05 (mole ratio). The cyclization reaction may be run at temperatures of between 25° C up to reflux at atmospheric pressure (96° C). Still greater reflux temperatures may be used if the pressure is greater than atmospheric. Furthermore, in place of isopropenyl acetate as a cyclization agent, acetic anhydride or propionic anhydride may be used. The mole ratio of cyclization agent to 2-thia substituted 1,4-dione is preferably 4 to 5:1.

The reaction product is then purified by appropriate extraction and distillation techniques.

The 3-furyl sulfides of our invention can also be prepared by reacting 3-furan thiols, e.g. 2-methyl-3-furan thiol with an α-picolyl halide (2-pyridyl-methyl halide) (e.g. a bromide or chloride); (i) in the presence of a base such as an alkali metal alkoxide (e.g., sodium methoxide); (ii) at a temperature in the range of 15°–65° C; and (iii) in a suitable solvent, e.g., an anhydrous lower alkanol such as anhydrous methanol, ethanol or isopropanol. Thus, for example, α-picolyl chloride hydrochloride, when reacted with 2-methyl-3-furan thiol in anhydrous methanol in the presence of sodium methoxide at a temperature of 24° C will yield (2-methyl-3-furyl) (2-pyridylmethyl) sulfide.

The following compounds of our invention produced using the above processes have useful organoleptic properties giving rise to their use as foodstuff flavors as set forth in an illustrative manner in the following table:

TABLE I

| 3-Furyl Sulfide Compound | Structure | Flavor Properties |
|---|---|---|
| (2-methyl-3-furyl) (2-pyridylmethyl) sulfide | | Sweet and meaty aroma and a sweet meaty and nutty flavor with metallic and mouthfeel nuances. |
| (2-pyridylmethyl) (2,5-dimethyl-3-furyl)sulfide | | Tomato-like nuances and sweet meat nuances. |

The 3-furyl sulfides according to the present invention can be used to alter, vary, fortify, modify, enhance or otherwise improve the organoleptic properties, including flavor and/or aroma, of a wide variety of materials which are ingested, consumed or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

The term "enhance" is used herein to mean the intensification of a flavor or aroma characteristic or note without the modification of the quality thereof. Thus, "enhancement" of a flavor or aroma means that the enhancement agent does not add any additional flavor note or nuance.

Such 3-furyl sulfides of this invention are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma to a consumable article.

The term "foodstuff" as used herein includes both solid and liquid ingestible materials for man or animals, which materials usually do, but need not, have nutritional value. Thus, foodstuffs include meats, gravies, soups and convenience foods, vegetables, snack foods, dog and cat foods, other veterinary products and the like.

When the 3-furyl sulfides according to this invention are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensififiers.

When the 3-furyl sulfides of our invention are used to modify or enhance or alter the aroma or taste of meat flavored substances or substances to be meat flavored, examples of preferred co-flavoring adjuvants are:

Methyl thiazole alcohol (4-methyl-5-betahydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercaptopropionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
2-Ethyltetrahydrofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-Propyldihydrofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;
Bis(2-methyl-3-dihydrofuryl) sulfide;
Bis(2-methyl-3-tetrahydrofuryl) sulfide;
Bis(2-methyl-3-tetrahydrofuryl) disulphide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
Bis(2,5-dipropyl-3-furyl)disulfide
Bis(2,5-dipropyl-3-furyl) sulfide;

Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-isopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes;
2-Butyl thiophene;
2,3-Dimethyl thiophene;
5-Methyl furfural;
Acetyl furan
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Cysteine;
Hydrolyzed fish protein; and
Tetramethyl pyrazine. When the 3-furyl sulfides according to this invention are used in order to enhance, modify, augument or alter the aroma or taste of tomato flavored foodstuffs or foodstuffs where tomato flavors are to be imparted, examples of preferred co-flavoring adjuvants are:
2-isobutyl-thiazole;
2-n-butyl-thiazole;
2-phenyl-4-pentenal;
2-phenyl-4-pentenaldimethyl-acetyl; and
2-phenyl-4-pentenaldiethyl-acetal.

The 3-furyl sulfides or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums and the like. The 3-furyl sulfides according to this invention can be incorporated with the carriers by conventional means such as spray-drying, drum-drying, and the like. Such carriers can also include materials for coacervating the 3-furyl sulfides (and other flavoring ingredients, as present) to provide encapsulated products. When the carrier is in emulsion the flavoring composition can also contain emulsifiers such as mono- and diglycerides of fatty acids and the like. With these carriers or vehicles, the desired physical form of the composition can be prepared.

The quantity of 3-furyl sulphide(s) utilized should be sufficient to impart the desired flavor characteristic to the product, but on the other hand, the use of an excessive amount of the derivatives is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate compositions contain from about 0.0001 parts per million (ppm) to about 250 ppm of 3-furyl sulfides. More particularly, in food compositions, it is desirable to use from about 0.0005 ppm to 100 ppm in enhancing or modifying or imparting flavors and in certain preferred embodiments of the invention, from 0.2 to 50 ppm of the derivatives are included to add positive flavors to the finished product. All parts, proportions, percentages, and ratios herein are by weight unless otherwise indicated.

The amount of 3-furyl sulfides of our invention to be utilized in flavoring compositions can be varied over a wide range to the foodstuff. Thus, amounts of one or more derivatives according to the present invention of from about 2 ppm up to 80 percent of the total flavoring compositions can be incorporated in such compositions. It is generally found to be desirable to include from about 10 ppm up to about 20 percent of the 3-furyl sulfide in such compositions.

The following examples are given to illustrate embodiments of the invention as it is preferred to practice it. It will be understood that these examples are illustrative and the invention is not to be considered as restricted thereto except as indicated in the appended claims.

EXAMPLE I

PREPARATION OF
(2-METHYL-3-FURYL)(2-PYRIDYLMETHYL)-
SULFIDE

Reaction:

+ 2NaCl

Into a 25 ml 3 neck round bottom flask equipped with magnetic stirrer, pot thermometer, Y tube, nitrogen inlet tube, reflux condenser and heating mantle is placed a solution of 0.54 g (0.01 moles) of sodium methoxide dissolved in 3 ml absolute methanol. The reaction mass is maintained at 25°-30° C and a solution of 0.57 g (0.005 moles) of 2-methyl-3-furan thiol in 3 ml absolute methanol is added to the reaction mass. While maintaining the reaction mass at 25° C, picolyl chloride hydrochloride (0.82 g; 0.005 moles) dissolved in 2 ml absolute methanol is added to the reaction mass. The reaction being exothermic, the reaction mass warms up to 42° C and a white solid precipitate forms. The reaction mass is then allowed to cool to 25° C (with stirring) over a period of 30 minutes. The reaction is then heated to reflux (60° - 65° C) under nitrogen and reflux is continued for a period of 1 hour. The reaction mass is cooled to 25° C. After remaining at room temperature for a period of 12 hours, 10 ml of water is added to the reaction mass with stirring, causing the reaction mass to now exist in two phases; an aqueous phase and an organic phase. The pH of the reaction mixture is 5. 7 ml of n-hexane is then added to the reaction mass with stirring and transferred to a separatory funnel. The aqueous layer is separated from the organic phase and extracted with 8 ml n-hexane after first diluting the aqueous phase with another 10 ml of water. The hexane extracts are combined, washed with 7 ml of saturated sodium chloride solution, dried over anhydrous sodium sulfate, gravity filtered, then concentrated on a rotary evaporator using water-aspirator vacuum.

Figure 1:
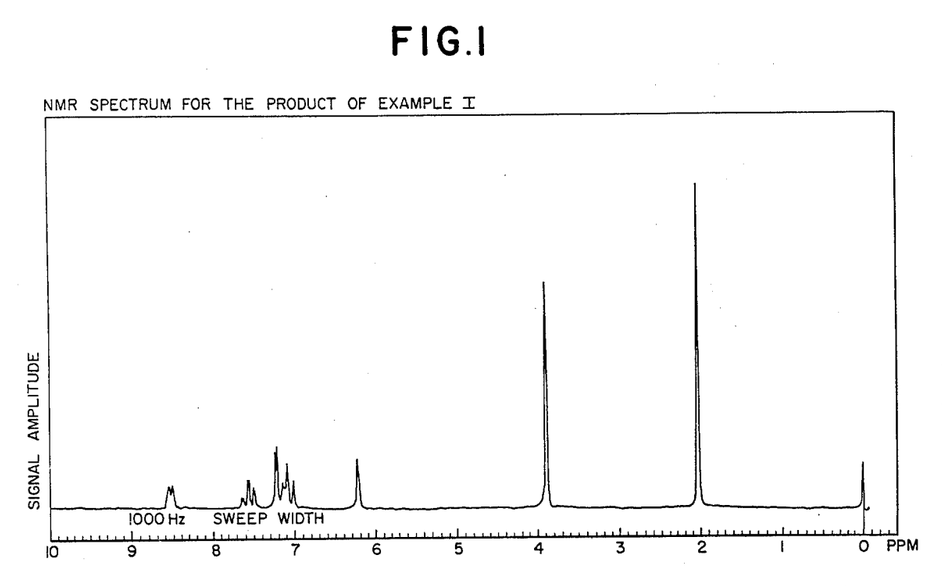
FIG. 1 is the NMR spectrum for the product of Example I, wherein (2-methyl-3-furyl)(2-pyridylmethyl)sulfide is produced.
Figure 2:
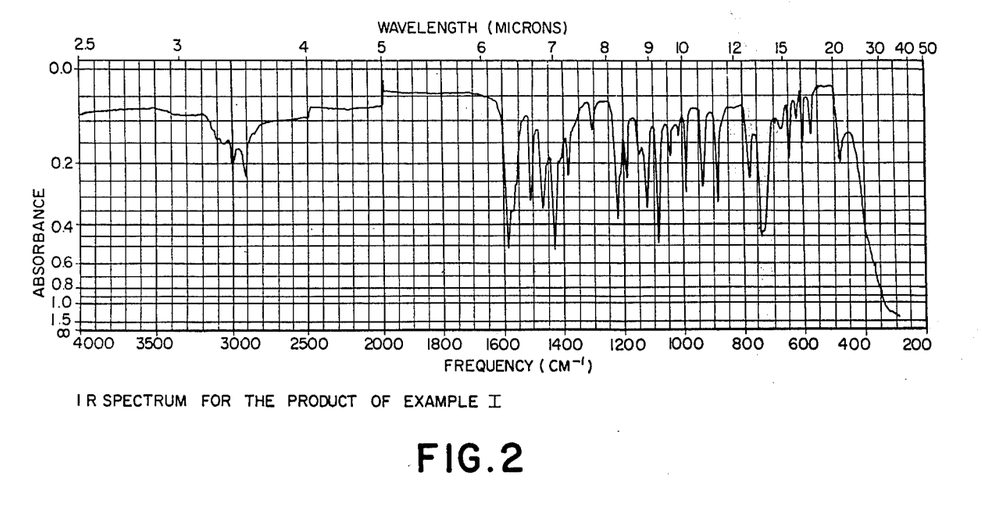
FIG. 2 is the IR spectrum for the product of Example I, wherein (2-methyl-3-furyl)(2-pyridylmethyl)sulfide is produced.

The product is isolated by GLC trapping and NMR, IR and Mass Spectral analyses confirm that the resulting material, having a molecular weight of 205 has the structure.

NMR analysis is as follows:

| SIGNAL | | INTERPRETATION | |
|---|---|---|---|
| 2.04 ppm | (s) | O—<br>\|<br>CH$_3$—C= | 3 H |
| 3.92 | (s) | —S—CH$_2$—(pyridine) | |
| 6.22 | (d) | H (furan) | 1 H |
| 7.08 | (m) | H$_3$, H$_5$ of pyridine | 2 H |
| 7.22 | (d) | H (furan) | 1 H |
| 7.57 | (t) | H$_4$ of pyridine | 1 H |
| 8.52 | (d) | H$_6$ of pyridine | 1 H |

IR analysis is as follows: 730, 740, 885, 930, 990, 1085, 1120, 1220, 1430, 1465, 1510, 1565, 1585, 2910, 3000 cm$^{-1}$. Mass Spectral analysis is as follows:

| m/e | Relative Intensity |
|---|---|
| 39 | 10$^5$ |
| 43 | 8$^6$ |
| 45 | 6 |
| 51 | 6 |
| 65 | 14$^2$ |
| 92 | 12$^4$ |
| 93 | 100$^1$ |
| 94 | 7 |
| 113 | 5 |
| M205 | 12$^3$ |

This material has a sweet meat-like flavor and aroma with meaty mouthfeel nuances.

EXAMPLE II (2-methyl-3-furyl)(2-pyridylmethyl) sulfide prepared according to the process of Example I is added to a 2% aqueous solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, "flavorings", corn sugar, beef extract, caramel color, hydrogenated vegetable fat, U.S. certified food color)

at the rate of 1 ppm. The resulting beef flavor has a sweet meat-like character. The meaty mouthfeel is improved.

EXAMPLE III

PREPARATION OF (2-PYRIDYLMETHYL)(2,5-DIMETHYL-3-FURYL)SULFIDE

Reaction:

Into a 25 ml 3 neck round bottom flask equipped with magnetic stirrer, pot thermometer, Y tube, nitrogen inlet tube, reflux condenser and heating mantle, is placed a solution of 0.54 g (0.01 moles) of sodium methoxide dissolved in 3 ml absolute methanol. The reaction mass is maintained at 25°-30° C and a solution of 0.64 g (0.005 moles) of 2,5-dimethyl-3-furan thiol in 3 ml absolute methanol is added to the reaction mass. While maintaining the reaction at 25° C, picolyl chloride hydrochloride (0.82 g; 0.005 moles) dissolved in 2 ml absolute methanol is added to the reaction mass. The reaction being exothermic, the reaction mass warms up to 42° C and a white solid precipitate forms. The reaction mass is allowed to cool to 25° C with stirring over a period of 30 minutes. The reaction mass is then heated to reflux (60° – 65° C) under nitrogen and reflux is continued for a period of 1 hour. The reaction mass is cooled to 30° C and flushed with nitrogen. After remaining at room temperature for a period of 20 hours, 10 ml. of water is added to the reaction mass with stirring, causing the reaction mass to now exist in two phases; an aqueous phase and an organic phase. The pH of the reaction mixture is 5. 7 ml of n-hexane is then added to the reaction mass with stirring and transferred into a separatory funnel. The aqueous layer is separated from the organic phase and extracted with 8 ml n-hexane after first diluting the aqueous phase with another 10 ml of water. The hexane extracts are combined, washed with 7 ml of saturated sodium chloride solution, dried over anhydrous sodium sulfate, gravity filtered, and concentrated on a rotary evaporator using water-aspirator vacuum.

Figure 3:
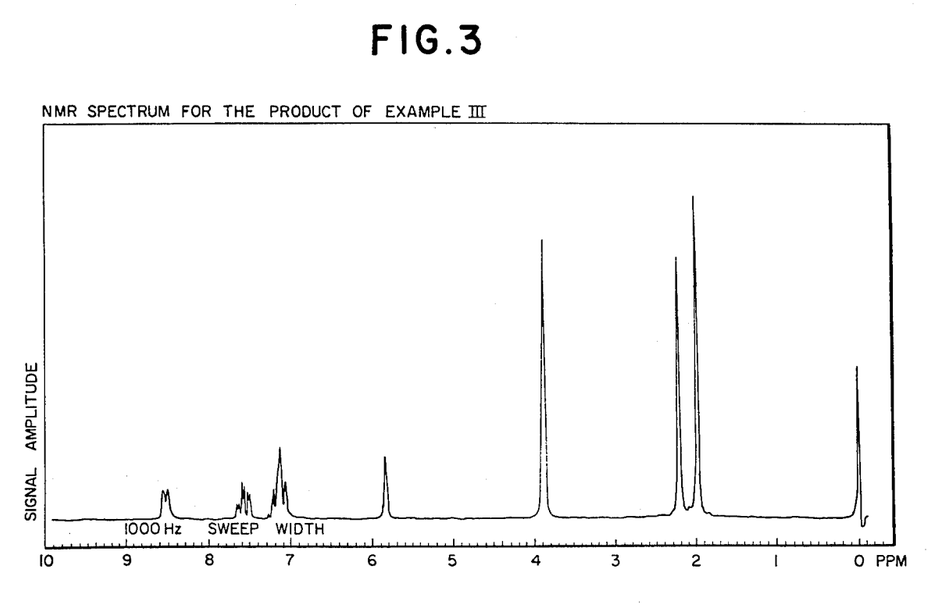
FIG. 3 is the NMR spectrum for the product of Example III, wherein (2-pyridylmethyl)(2,5-dimethyl-3-furyl)sulphide is produced.
Figure 4:
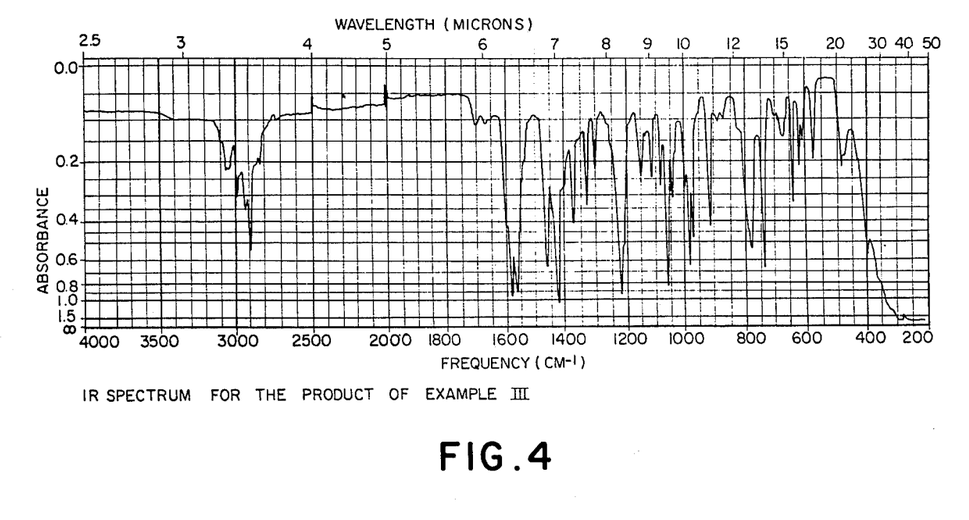
FIG. 4 is the IR spectrum for the product of Example III, wherein (2-pyridylmethyl)(2,5-dimethyl-3-furyl)sulphide is produced.

The product is isolated by GLC trapping and NMR, IR and Mass Spectral analyses confirm that the resulting material, having a molecular weight of 219 has the structure:

This material has a tomato-like nuance and a sweet meat nuance. NMR analysis is as follows:

| SIGNAL | | INTERPRETATION | |
|---|---|---|---|
| 1.99 ppm | (s) | $CH_3-C=$ | 3 H |
| 2.20 ppm | (s) | $O-$ | 3 H |
| 3.90 | (s) | $N\!-\!CH_2\!-\!S\!-$ | 2 H |
| 5.82 | (s) | $H_4$ of furan | 1 H |
| 7.12 | (t) | $H_3$, $H_5$ of pyridine | 2 H |
| 7.58 | (m) | $H_4$ of pyridine | 1 H |
| 8.54 | (d) | $H_6$ of pyridine | 1 H |

IR analysis is as follows: 645, 745, 780, 920, 980, 990, 1045, 1065, 1220, 1330, 1380, 1430, 1465, 1565, 1585, 2920, 2940, 3000 cm$^{-1}$.

Mass Spectral analysis is as follows:

| m/e | Relative Indensity |
|---|---|
| 39 | 10[4] |
| 43 | 34[2] |
| 65 | 9 |
| 92 | 5 |
| 93 | 100[1] |
| 94 | 6[6] |
| 127 | 8[5] |

| m/e | Relative Indensity |
|---|---|
| M219 | 13[3] |

EXAMPLE IV (2-pyridylmethyl)(2,5-dimethyl-3-furyl) sulfide prepared according to the process of Example III is added to a 2% solution of Wyler's "Beef Flavored Instant Bouillon" (manufactured by Wyler Foods, Division of Borden, Inc., Chicago, Ill., U.S.A.).

(Ingredients: salt, hydrolyzed vegetable protein, malto dextrin, sugar, beef fat, water, monosodium glutamate, flavorings, corn sugar, beef extract, caramel color, hydrogenated vegetable fat, U.S. certified food color)

EXAMPLE V

PREPARATION OF (2-PYRIDYLMETHYL)(2,5-DIMETHYL-3-FURYL)SULPHIDE (2-pyridylmethyl)(2,5-dimethyl-3-furyl)sulfide prepared according to the process set forth in Example III is added to a commercial instant tomato soup mix ("Tomatencream Suppe," C. H. Knorr, Heilbronn, West Germany) at the rate of 2 ppm (based on the weight of the soup as ready to eat, produced by adding 80 g of the dry soup mix to 1000 ml water and then bringing the resulting mixture to a boil). A second "control" is prepared which is identical to the initial sample except for the absence of the (2-pyridylmethyl)(2,5-dimethyl-3-furyl)sulfide. A four member panel of flavorists compared the control to the soup containing the (2-pyridylmethyl)(2,5-dimethyl-3-furyl) sulfide. All four members of the panel indicated a strong preference for the tomato soup containing the (2-pyridylmethyl)(2,5-dimethyl-3-furyl)sulfide. All four members of the panel indicated that the soup containing the (2-pyridylmethyl)(2,5-dimethyl-3-furyl)sulfide includes a natural tomato-like, sweet meat note which is not present in the soup prepared without using the (2-pyridylmethyl)(2,5-dimethyl-3-furyl)sulphide.

What is claimed is:

1. A 3-furyl sulfide having the structure:

wherein $R_2$ and $R_3$ are each selected from the group consisting of methyl and hydrogen, at least one of $R_2$ and $R_3$ being methyl.

2. The 3-furyl sulfide of Claim 1, wherein $R_3$ is hydrogen and $R_2$ is methyl.

3. The 3-furyl sulfide of Claim 1, wherein $R_2$ and $R_3$ are each methyl.

4. A process for augmenting or enhancing the sweet meaty or tomato or nutty flavor of a foodstuff, comprising the step of adding to said foodstuff in an amount of from about 0.0001 ppm up to about 250 ppm of a 3-furyl sulfide compound having the structure:

wherein $R_2$ and $R_3$ are each selected from the group consisting of methyl and hydrogen, at least one of $R_2$ and $R_3$ being methyl.

5. The process of claim 4 wherein the flavor of the foodstuff to be altered is a sweet meaty flavor and $R_2$ is methyl and $R_3$ is hydrogen.

6. The process of claim 4 wherein the flavor of the foodstuff to be altered is a tomato flavor and $R_2$ and $R_3$ are each methyl.

7. The process of claim 4, wherein the flavor of the foodstuff to be altered is a sweet meaty flavor and $R_2$ and $R_3$ are each methyl.

8. A foodstuff flavor composition capable of augmenting or enhancing a flavor selected from the group consisting of sweet meaty, nutty and tomato flavor containing (i) from 10 ppm up to 20% by weight of said flavor composition of a 3-furyl sulfide compound having the structure:

wherein $R_2$ and $R_3$ are each selected from the group consisting of methyl and hydrogen, at least one of $R_2$ and $R_3$ being methyl; and (ii) at least one flavor adjuvant selected from the group consisting of:

Methyl thiazole alcohol (4-methyl-5-betahydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
2-Ethyltetrahydrofuran-3-thiol;
2-Propylfuran-3-thiol;
2-Isopropylfuran-3-thiol;
2-Isopropyldihydrofuran-3-thiol;
2-Isopropyltetrahydrofuran-3-thiol;
2-Propyldihydrofuran-3-thiol;
2,5-Dimethylfuran-3-thiol;
2,5-Dimethyldihydrofuran-3-thiol;
2,5-Dimethyltetrahydrofuran-3-thiol;
2,5-Diethylfuran-3-thiol;
2,5-Diethyltetrahydrofuran-3-thiol;
2-Ethyl-5-methylfuran-3-thiol;
2-Methyl-5-ethylfuran-3-thiol;
2-Ethyl-5-methyldihydrofuran-3-thiol;
2-Ethyl-5-methyltetrahydrofuran-3-thiol;
2,5-Dipropylfuran-3-thiol;
2,5-Diisopropylfuran-3-thiol;
5-Isopropyl-2-methylfuran-3-thiol;
2-Butylfuran-3-thiol;
2-Ethyl-5-propyltetrahydrofuran-3-thiol;
Bis(2-methyl-3-furyl) sulfide;
Bis(2-methyl-3-furyl) disulfide;
Bis(2-ethyl-3-furyl) sulfide;
Bis(2-ethyl-3-furyl) disulfide;
Bis(2,5-dimethyl-3-furyl) sulfide;
Bis(2,5-dimethyl-3-furyl) disulfide;
Bis(2-methyl-3-dihydrofuryl) sulfide;
Bis(2-methyl-3-tetrahydrofuryl) sulfide;
Bis(2-methyl-3-tetrahydrofuryl) disulfide;
Bis(2-methyl-3-dihydrofuryl) disulfide;
Bis(2,5-diethyl-3-dihydrofuryl) sulfide;
Bis(2,5-diethyl-3-furyl) sulfide;
Bis(2-ethyl-5-methyl-3-furyl) disulfide;
Bis(2,5-diethyl-3-furyl) disulfide;
Bis(2,5-dipropyl-3-furyl)disulfide
Bis(2,5-dipropyl-3-furyl) sulfide;
Bis(2,5-dibutyl-3-furyl) disulfide;
Bis(5-ethyl-2-methyl-3-dihydrofuryl) disulfide;
Bis(2-isopropyl-3-furyl) sulfide;
Bis(2-isopropyl-3-furyl) disulfide;
Bis(2-isopropyl-3-dihydrofuryl) sulfide;
Bis(2-isopropyl-3-tetrahydrofuryl) disulfide;
Alkyl pyrazine;
Methyl pyrazine;
2-Ethyl-3-methyl pyrazine;
Tetramethyl pyrazine;
Dipropyl disulfide;
Methyl benzyl disulfide;
Alkyl thiophenes;
2-Butyl thiophene;
2,3-Dimethyl thiophene;
5-Methyl furfural;
Acetyl furan
2,4-Decadienal;
Guiacol;
Phenyl acetaldehyde;
δ-Decalactone;
d-Limonene;
Acetoin;
Amyl acetate;
Maltol;

Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
2-isobutyl-thiazole;
2-n-butyl-thiazole;
2-phenyl-4-pentenal;
2-phenyl-4-pentenal-dimethyl-acetal; and
2-phenyl-4-pentenal-diethyl-acetal.

* * * * *

UNITED STATES PATENT AND TRADEMARK OFFICE
CERTIFICATE OF CORRECTION

PATENT NO. : 3,985,908
DATED : October 12, 1976
INVENTOR(S) : WILLIAM J. EVERS, HOWARD H. HEINSOHN, JR., MANFRED HUGO VOCK and CHRISTOPHER GIACINO It is certified that error appears in the above-identified patent and that said Letters Patent are hereby corrected as shown below:

Col. 1, line 48, the word "nuttty" should read "nutty".

Col. 3, line 8, last word "formual" should read "formula".

Col. 5, line 64, last word "intensififiers" should read "intensifiers".

Col. 6, line 49, the word "2,5-diisopropylfuran-3-thiol" should read "2,5-Diisopropylfuran-3-thiol".

Signed and Sealed this

Twenty-second Day of March 1977

[SEAL]

Attest:

RUTH C. MASON
Attesting Officer

C. MARSHALL DANN
Commissioner of Patents and Trademarks